Sept. 26, 1967  S. J. CISLO  3,343,856
BALL JOINT CONSTRUCTION FOR MOTOR VEHICLE
SUSPENSION AND STEERING SYSTEMS
Filed Dec. 17, 1964

STANLEY J. CISLO
INVENTOR

BY John R. Faulkner
Clifford L. Sadler

ATTORNEYS 3,343,856
BALL JOINT CONSTRUCTION FOR MOTOR VEHICLE SUSPENSION AND STEERING SYSTEMS
Stanley J. Cislo, Detroit, Mich., assignor to Ford Motor Company, Dearborn, Mich., a corporation of Delaware
Filed Dec. 17, 1964, Ser. No. 419,174
1 Claim. (Cl. 287—90)

The present invention relates to joint constructions and more particularly to ball joints for use in motor vehicles.

In automotive engineering, it has become common practice to provide ball joints for interconnecting the upper and lower suspension arms with the steering wheel spindle in independent front suspension systems. Ball joints are also used in the steering linkage to connect the steering tie rod with the steering arms of the wheel spindles. The present invention is particularly directed to an improved construction of such a ball joint.

It is the principal object of this invention to provide a ball joint construction that is characterized by its simplicity of manufacture and its low friction properties.

The present invention also has as one of its objects the construction of a ball joint assembly in which the parts remain in tight contact during the useful life of the joint.

More specifically it is an object of the present invention to provide an embodiment in which a stud has a bell shaped end portion. The end portion has a truncated spherical exterior surface that is in sliding engagement with a complementary bearing surface of the socket. In order to provide a proper bearing contact having consistent low frictional qualities, a rubber spring is positioned within the internal cavity of the end portion. The rubber spring provides a seat for a polished ball. The ball is engaged by a low friction bearing plug that is carried by the socket. The rubber spring is compressed to provide a preload to the engagement between the several bearing surfaces.

Figure 1:
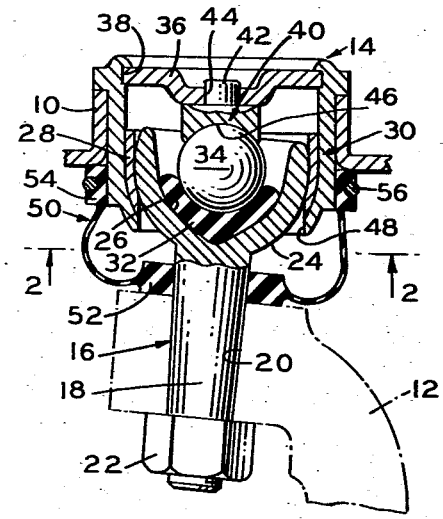
Figure 2:
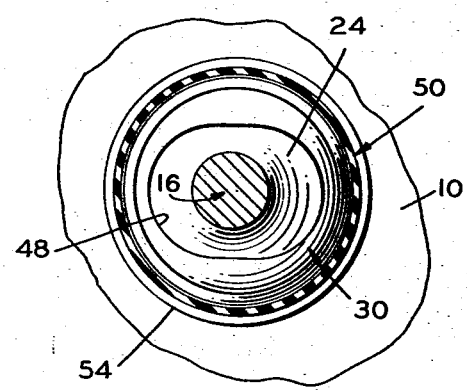

These and further objects of the present invention will become apparent from a consideration of the following discussion and the accompanying drawings in which:

FIGURE 1 is an elevational view partly in section of a ball joint constructed in accordance with the present invention, and FIGURE 2 is a sectional view taken along section lines 2—2 of FIGURE 1.

Referring now to the drawings wherein the preferred embodiment of this invention is illustrated, FIGURE 1 discloses a novel ball joint construction. In that figure, a vehicle suspension arm 10 is connected to a wheel spindle 12 by a ball joint assembly 14.

The assembly 14 comprises a stud member 16 which has a tapered shank portion 18 that is fitted within a hole 20 provided in the steering spindle 12. The hole 20 is also tapered to receive the shank 18 in a complementary fashion. The shank is held in tight engagement with the spindle 12 by means of the threaded nut 22.

The upper end of stud 16 is provided with a cup-shaped portion having an exterior semi-spherical bearing surface 24 and an internal concave surface 26.

The semi-spherical bearing surface 24 engages a truncated spherical bearing surface provided by a complementary bearing element 28. The bearing element 28 is situated within a sheet metal socket part 30 that is affixed to the suspension arm 10 by means of a press fit. The bearing element 28 is molded from a low friction plastic and is cemented or otherwise secured to the interior surface of the sheet metal socket part 30.

The concave interior surface in the end of the stud 16 receives a rubber cushion 32 against which a spherical bearing member 34 is seated.

The end of the sheet metal socket 30 is closed by a metal stamping 36 which is located in a groove 38 formed in the internal surface at the end of the socket 30. A plastic plug 40 has an extending portion 42 which fits within a hole 44 formed in the closure member 36. The plug 40 has a partially spherical bearing surface 46 that engages the spherical bearing element 34. The plug 40 may be formed from a plastic such as Teflon to provide low friction characteristics to the surface 46.

The socket member 30 has an elongated opening 48 through which the stud 16 extends. The opening 48 is of an enlarged size to permit the stud 16 to tilt and rotate within the socket as required to accommodate jounce and rebound movement between the suspension arm 10 and the wheel spindle 12.

The opening 48 is closed by a resilient rubber seal 50 which is of annular construction. The seal has a small diameter open end 52 which is positioned about the shank 18 of the stud 16 and is placed in sealed engagement with the adjacent surface of the spindle 12. The seal 50 also has an enlarged end 54 which is secured against the socket 30 by means of a snap ring 56. Because the seal 50 is in sealed engagement with the stud 16 and spindle 12 and also with the socket 30, dust and other contaminants are prevented from entering the interior of the socket 30 through the opening 48.

The rubber cushion 32 serves a dual function. Firstly, it positions and retains the spherical bearing element 34. Secondly, it is compressed during the assembly of the ball joint 14 so that it exerts a force which tends to keep the spherical bearing element 34 in engagement with the bearing surface 46 of the plug 40. The pressure of the rubber cushion 32 also causes the bearing surface 24 of the cup-shaped end of the stud 16 into engagement with the bearing surface of the bearing liner 28. This keeps the bearing surfaces in constant contact. Because of the higher coefficient of friction between the spherical bearing element 34 and the cushion 32, tilting and rotary motion of the stud 16 will be accompanied by a sliding engagement between the ball 34 and the bearing surface 46. Sliding motion will not occur between the ball 34 and the cushion 32.

The foregoing description constitutes the presently preferred construction of this invention. Modifications and alterations may occur to those skilled in the art that will come within the scope and spirit of the following claim.

I claim:

An articulated joint for a vehicle suspension system comprising an annular socket part, a stud part having an enlarged bell shaped end fitted within said socket part, said bell shaped end having a convex exterior bearing surface, said socket part having a concave low friction plastic liner secured to the internal surface of said socket part and engaging said convex bearing surface, said bell shaped end having a concave interior portion, a cup shaped rubber element seated in said interior portion, a spherical bearing element seated in said cup shaped rubber element and concentric with said convex bearing surfaces, a closure member sealing one end of said annular socket part, a low friction plastic bearing plug having a diameter equal to approximately that of said spherical bearing element and having a stem secured in a hole in said closure member, said bearing piece having a spherical bearing surface slidably engaging said spherical bearing element, said rubber element being loaded in compression whereby a force is exerted urging said convex bearing surface into engagement with said liner, said rubber element having a greater coefficient of friction than said bearing piece whereby relative angular displacement between said parts will cause sliding movement between said spherical bearing element and said piece rather than between said spherical bearing element and said rubber element.

References Cited

UNITED STATES PATENTS

| | | | |
|---|---|---|---|
| 2,461,866 | 2/1949 | Alldredge | 287—90 |
| 2,827,303 | 3/1958 | Herbenar. | |
| 2,942,901 | 6/1960 | Booth | 287—90 |

FOREIGN PATENTS

| | | |
|---|---|---|
| 1,258,410 | 3/1961 | France. |
| 508,890 | 7/1939 | Great Britain. |
| 540,594 | 3/1956 | Italy. |

CARL W. TOMLIN, *Primary Examiner.*

A. V. KUNDRAT, *Assistant Examiner.*